US 6,744,595 B2

(12) United States Patent
Blair et al.

(10) Patent No.: US 6,744,595 B2
(45) Date of Patent: Jun. 1, 2004

(54) PORTABLE DATA STORAGE CARTRIDGE ENCODED MULTI-POSITION MECHANICAL INDICATOR (75) Inventors: John Ray Blair, Tucson, AZ (US); Dennis Hurley Byrne, Tucson, AZ (US); Allen Ronald Cox, Eastleigh (GB); David Michael Davis, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 10/035,188

(22) Filed: Jan. 4, 2002

(65) Prior Publication Data
US 2003/0128467 A1 Jul. 10, 2003

(51) Int. Cl.⁷ .................... G11B 23/02; G11B 33/10
(52) U.S. Cl. .................................. 360/132; 360/60
(58) Field of Search .................. 360/132, 133, 360/60; 242/344, 347

(56) References Cited

U.S. PATENT DOCUMENTS

| | | | |
|---|---|---|---|
| 3,755,641 A | 8/1973 | Rackman | 200/163 |
| 4,012,011 A | * 3/1977 | Saito | 360/132 |
| 4,320,421 A | 3/1982 | Larson et al. | 360/60 |
| 4,399,481 A | 8/1983 | Loranger et al. | 360/132 |
| 4,679,101 A | 7/1987 | Tezuka | 360/60 |
| 4,814,923 A | 3/1989 | Kawada et al. | 360/132 |
| 4,844,378 A | 7/1989 | Oishi | 242/199 |
| 5,699,216 A | 12/1997 | Doty | 360/132 |
| 5,786,967 A | 7/1998 | Gerfast et al. | 360/132 |

FOREIGN PATENT DOCUMENTS

| | | | |
|---|---|---|---|
| JP | 63-102086 | 5/1988 | G11B/23/28 |
| JP | 04-247375 | 9/1992 | G11B/23/28 |
| JP | 05-198136 | 8/1993 | G11B/23/28 |
| JP | 6-243651 | 9/1994 | G11B/23/28 |

OTHER PUBLICATIONS

"File Protect Device", IBM Technical Disclosure Bulletin, 02/86, vol. 28, No. 9, p. 3752.
"File Protect Detent and Sleeve", Research Disclosure, 02/85, No. 25038.

* cited by examiner

Primary Examiner—Craig A. Renner
(74) Attorney, Agent, or Firm—John H. Holcombe (57) ABSTRACT An indicator comprises a rotary device in the form of a right cylinder arranged to be rotatable in a chamber of a portable data storage cartridge, which has an exterior wall opening to the chamber. A peripheral surface of the rotary device has an encoded pattern of at least one cylindrical surface and a plurality of facets interrupting the cylindrical surface(s). The facets are located at various axial positions, and at various angularly spaced rotational positions, such that, at differing rotational positions of the rotary device, at least one or none of the facets is positioned at the exterior opening.

38 Claims, 5 Drawing Sheets

PORTABLE DATA STORAGE CARTRIDGE ENCODED MULTI-POSITION MECHANICAL INDICATOR

DOCUMENT INCORPORATED BY REFERENCE

Commonly assigned U.S. patent application Ser. No. 09/842,030, filed Apr. 26, 2001, is incorporated for its showing of portable data storage cartridges and a transfer station for providing data transfer with respect to such portable data storage cartridges.

FIELD OF THE INVENTION

This invention relates to portable data storage cartridges, and, more particularly, to devices for providing an indication with respect to such portable data storage cartridges.

BACKGROUND OF THE INVENTION

Portable data storage cartridges provide convenient means for storing data which may be transported between uses. One example comprises automated data storage libraries which can contain large quantities of portable data storage cartridges on storage shelves and employ robot accessors to access a cartridge when needed and deliver the cartridge to a data storage drive or transfer station.

In some instances, data, once recorded on a data storage medium of a portable data storage cartridge, is intended to be archived and left unchanged. Hence, a "write protect" device is placed in the cartridge which may be adjusted to indicate whether the data storage medium is write enabled and can be erased and written over, or whether the data storage medium is write protected and is not to be erased, as detected by a switch at the data storage drive which accepts the cartridge. Examples of two-position "on-off" write protect devices for magnetic tape media in which one position is the same as though no cartridge is present are illustrated in U.S. Pat. No. 4,320,421, Larson et al., U.S. Pat. No. 4,399,481, Loranger et al., U.S. Pat. No. 5,699,216, Doty, and U.S. Pat. No. 5,786,967, Gerfast et al. Gerfast et al. arranges the size of a recess and the write protect device such that separate a switch of the data storage drive for detecting the presence of a cartridge may also be utilized with the write protect switch to write protect magnetic tape having a different coercivity from being written by an older tape drive, and to selectively write protect the tape in a newer tape drive. Thus, Gerfast et al. provides a two position "on-off" write protect, in which one position is the same as though no cartridge is present.

The tape of a magnetic tape data storage cartridge is a medium only and has no capability for providing processing capability. Hence, a write protect for the cartridge is useful to prevent mistaken erasure of important data stored on the medium in the cartridge.

The incorporated '030 U.S. Patent Application illustrates a different type of portable data storage cartridge which comprises a data storage device, such as a magnetic disk drive, an optical disk drive, an electronic memory, etc., and the transfer station of the '030 Application is arranged to distinguish between a magnetic tape cartridge and a cartridge having a data storage device. A data storage device comprises processing capability for the device, such that data may be stored by the device in an efficient manner without any need for a simple write protect for the entire portable data storage cartridge.

SUMMARY OF THE INVENTION

It would be advantageous to externally indicate information regarding a portable data storage cartridge, such as the type of device or medium located in the cartridge, or other characteristics of the cartridge, as well as write protection, if needed. Hence, it is an object of the present invention to provide a means for externally indicating various characteristics of portable data storage cartridges.

A multi-position mechanical indicator is provided for a portable data storage cartridge, the portable data storage cartridge having at least a data storage medium therein. Examples comprise a portable data storage cartridge having a data storage device, such as a magnetic disk drive, an optical disk drive, an electronic memory, etc., or a portable data storage cartridge having a medium without a device, such as a magnetic tape or an optical disk.

The portable data storage cartridge has a chamber closely adjacent an exterior wall of the cartridge and has an opening extending through the exterior wall to the chamber.

The indicator comprises a rotary device in the general form of at least one right cylindrical section having a central axis of rotation, and arranged to be rotatable in the chamber. A peripheral surface of the rotary device right cylindrical section has an encoded pattern of at least one cylindrical surface and of a plurality of facets interrupting the cylindrical surface(s). The facets are located at various axial positions in the direction of the of the central axis of rotation, and located at various angularly spaced rotational positions about the central axis of rotation. Thus, at differing rotational positions of the rotary device, at least one or none of the facets is positioned at the exterior wall opening of the portable data storage cartridge. In one embodiment of the present invention, the facets of the encoded pattern are parallel to the central axis of rotation of the rotary device, such that they and the cylindrical surfaces interact with switches to provide the desired indications.

In one embodiment of the present invention, at least one retaining element is provided on the rotary device for interacting with at least one matching retaining element of the cartridge to retain the rotary device in at least one of the rotary positions. In one example, the rotary device retaining element comprises at least one detent, and the matching retaining element of the cartridge comprises a plurality of indentations in the cartridge chamber, such that the rotary device retaining element detent(s) may rest in any of the plurality of indentations. In another example, the rotary device retaining element comprises a plurality of indentations, and the matching retaining element of the cartridge comprises at least one detent which may rest in any of the plurality of indentations.

In either example, a spring may urge the detent(s) into the indentations. Alternatively, in the first example, the rotary device retaining element detent comprises a resilient material, and the rotary device is arranged to fit within the chamber of the cartridge with a compression force thereon when the rotary device retaining element detent(s) is out of all of the plurality of indentations in the cartridge chamber, also urging the detent(s) into the indentations. In the second example, the rotary device may comprise a resilient material, and the rotary device is arranged to fit within the chamber of the cartridge with a compression force thereon when the detent(s) is out of all of the plurality of indentations of the rotary device, also urging the detent(s) into the indentations.

In one embodiment, a cylindrical section of larger diameter than the cylindrical surface is provided, comprising a thumb wheel for rotating the rotary device in the chamber of the cartridge. The thumb wheel cylindrical section comprises a roughened surface for engaging the thumb wheel.

A facet comprises a flat or concave surface such that the radius of a facet from the central axis of rotation is substantially less than that of a cylindrical surface.

In one embodiment of the present invention, the facets of the encoded pattern are parallel to the central axis of rotation of the rotary device, such that they and the cylindrical surfaces interact with switches to provide the desired indications, the cylindrical surface comprising a "1" and activating a switch, and a facet comprising a "0" and not activating a switch. In accordance with an aspect of the present invention, no all "0" or all facet code is utilized, such that a switch is always activated when a cartridge is present, serving as a presence indicator, indicating that the cartridge is fully loaded.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
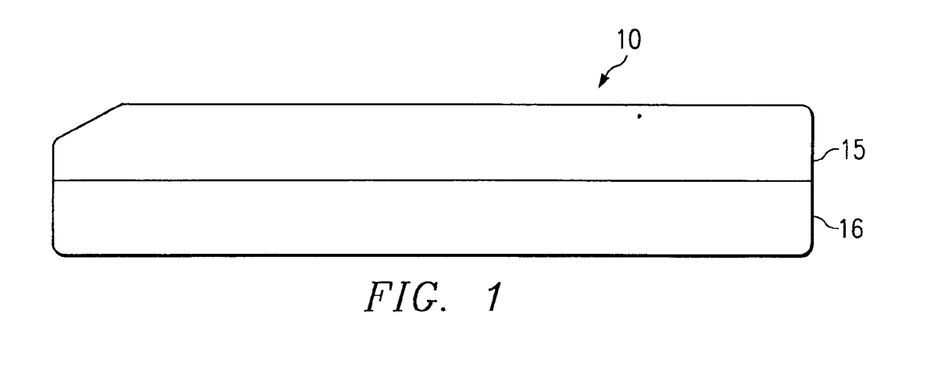
FIG. 1 is a side view of a portable data storage cartridge which may implement an encoded multi-position mechanical indicator in accordance with the present invention.
Figure 2:
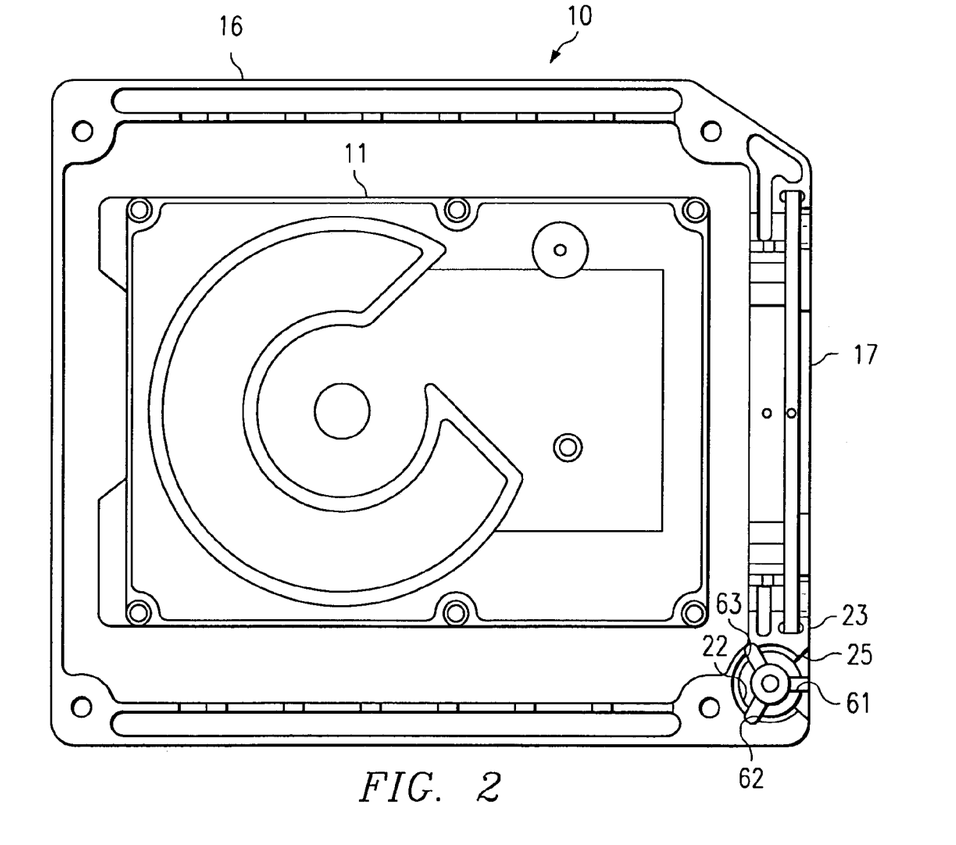
FIG. 2 is a top view of the lower half of the portable data storage cartridge of FIG. 1, showing a chamber internal to the cartridge.
Figure 3A:
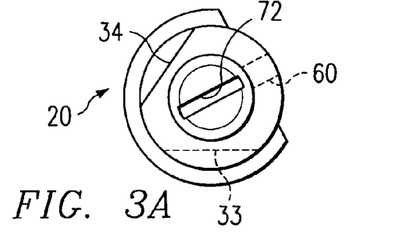
FIGS. 3A–3D illustrate top and front views of an embodiment of an encoded multi-position mechanical indicator in accordance with the present invention in two rotational positions.
Figure 3B:
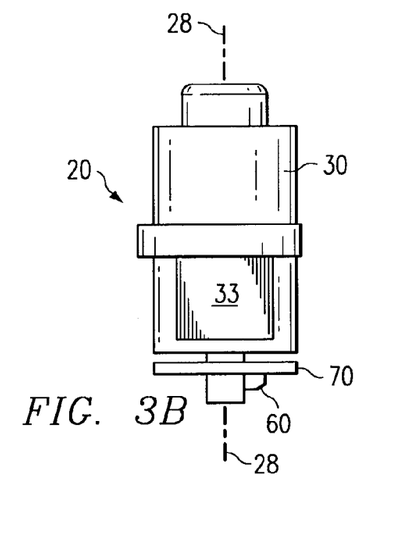
Figure 3C:
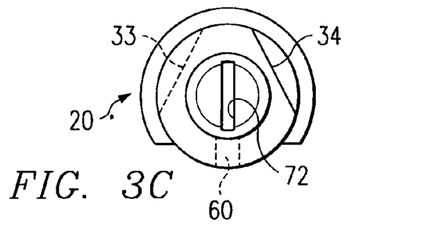
Figure 3D:
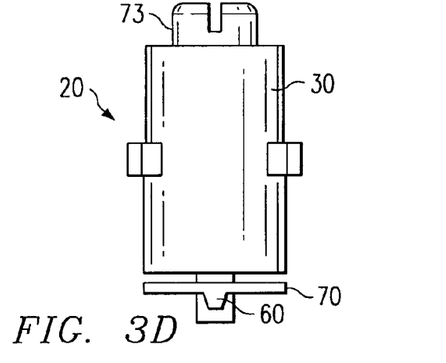
Figure 4A:
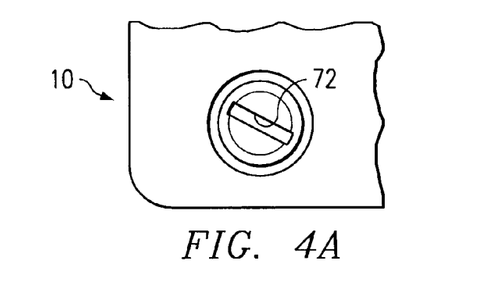
FIGS. 4A–4I illustrate top, front cut-away, and front views of the encoded multi-position mechanical indicator of FIGS. 3A–3D in the portable data storage cartridge of FIGS. 1 and 2, with the mechanical indicator in three rotational positions.
Figure 4B:
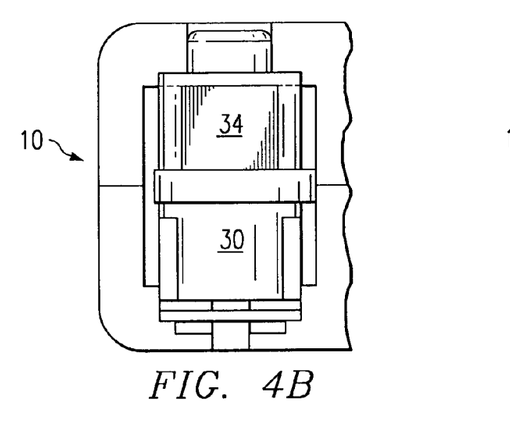
Figure 4C:
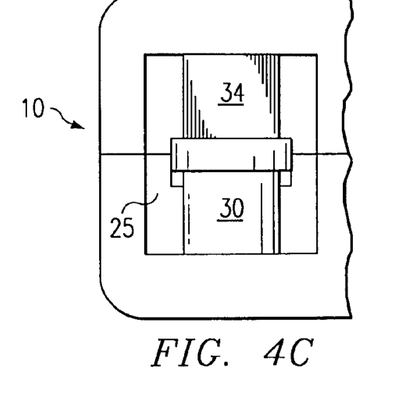
Figure 4D:
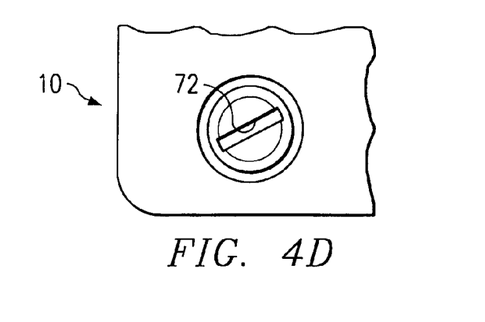
Figure 4E:
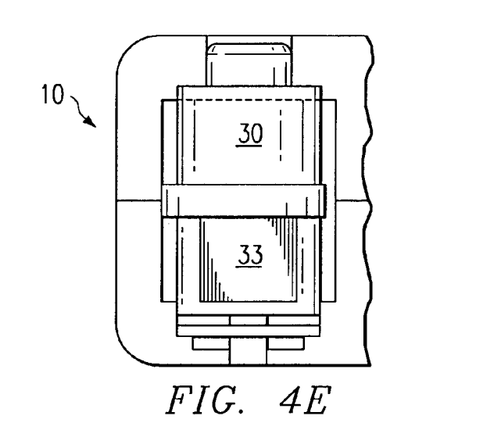
Figure 4F:
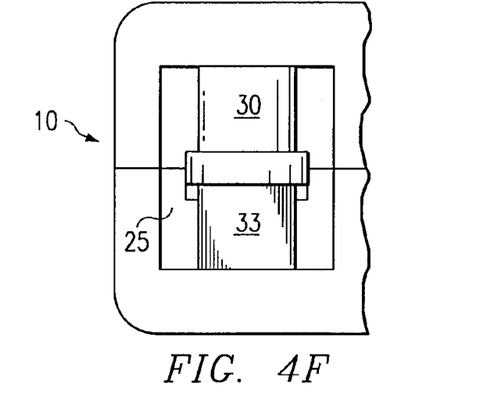
Figure 4G:
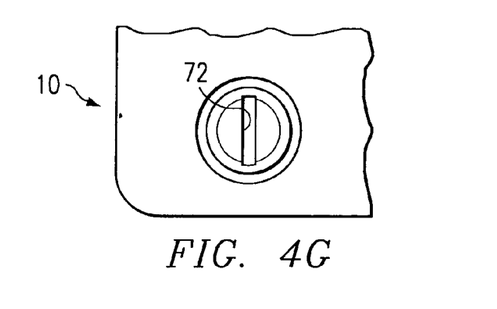
Figure 4H:
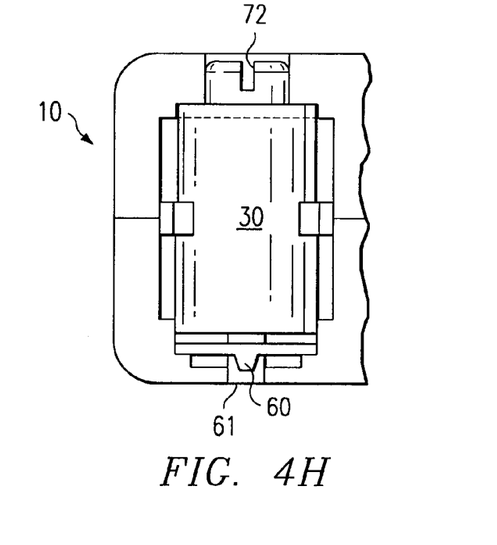
Figure 4I:
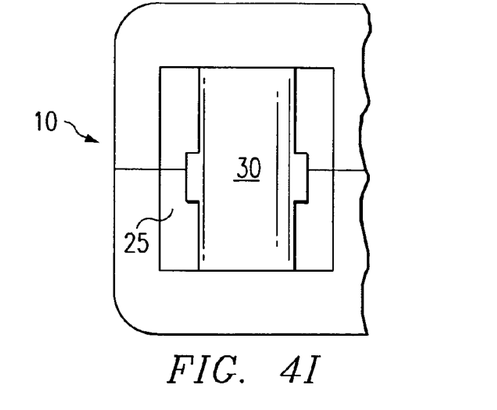

Referring to FIGS. 1 and 2, a portable data storage cartridge 10 is illustrated, which for example, houses a data storage device 11, such as discussed in the incorporated U.S. patent application Ser. No. 09/842,030. For convenience in assembly, the portable data storage cartridge 10 is provided in an upper half 15 and a lower half 16. FIG. 2 illustrates the lower half 16 of the cartridge, as viewed from above. As discussed above, the data storage device 11 of the incorporated '030 U.S. Patent Application may comprise a magnetic disk drive, an optical disk drive, an electronic memory, etc.

Referring additionally to FIGS. 3A–3D, in accordance with the present invention, a multi-position mechanical indicator rotary device 20 is provided for a portable data storage cartridge 10. The rotary device 20 indicates, externally of the cartridge 10, information regarding the portable data storage cartridge, such as the type of device or medium located in the cartridge, or other characteristics of the cartridge, as well as write protection, if needed. Examples of the indicated information comprise the type of storage device contained by the portable data storage cartridge, such as a magnetic disk drive, an optical disk drive, or an electronic memory. Alternatively, the indicated information may comprise the type of medium, such as a portable data storage cartridge having a medium without a device, such as a magnetic tape or an optical disk. The indicated information may additionally indicate the type of stored information, such as whether the information is for disaster recovery and which is write protected, or whether the information is a data set that is, e.g., personnel related, customer related etc.

Referring to FIG. 2, the portable data storage cartridge 10 has a chamber 22 closely adjacent an exterior wall 23 of the cartridge and has an opening 25 extending through the exterior wall to the chamber.

Referring to FIGS. 3A–3D, the indicator comprises a rotary device 20 in the general form of at least one right cylindrical section having a central axis of rotation 28, and arranged to be rotatable in the chamber 22 of the portable data storage cartridge 10 of FIG. 2.

A peripheral surface of the rotary device right cylindrical section has an encoded pattern of at least one cylindrical surface 30 and of a plurality of facets 33, 34 interrupting the cylindrical surface. As illustrated in FIGS. 4A–4I, the facets are located at various axial positions in the direction of the of the central axis of rotation 28 of FIG. 3B, and located at various angularly spaced rotational positions about the central axis of rotation. Various rotational positions of the rotational device comprise a first rotational position represented by FIGS. 4A–4C; a second rotational position represented by FIGS. 4D–4F; and a third rotational position represented by FIGS. 4G–4I. At differing rotational positions of the rotary device, at least one or none of the facets 33, 34 is positioned at the exterior wall opening 25 of the portable data storage cartridge. Thus, in FIG. 4C, facet 34 and cylindrical surface 30 are positioned at the exterior wall opening 25; in FIG. 4F, facet 33 and cylindrical surface 30 are positioned at the exterior wall opening 25; and in FIG. 4I, none of the facets and only cylindrical surface 30 is positioned at the exterior wall opening 25.

Figures 5, 6A, 6B, 7:
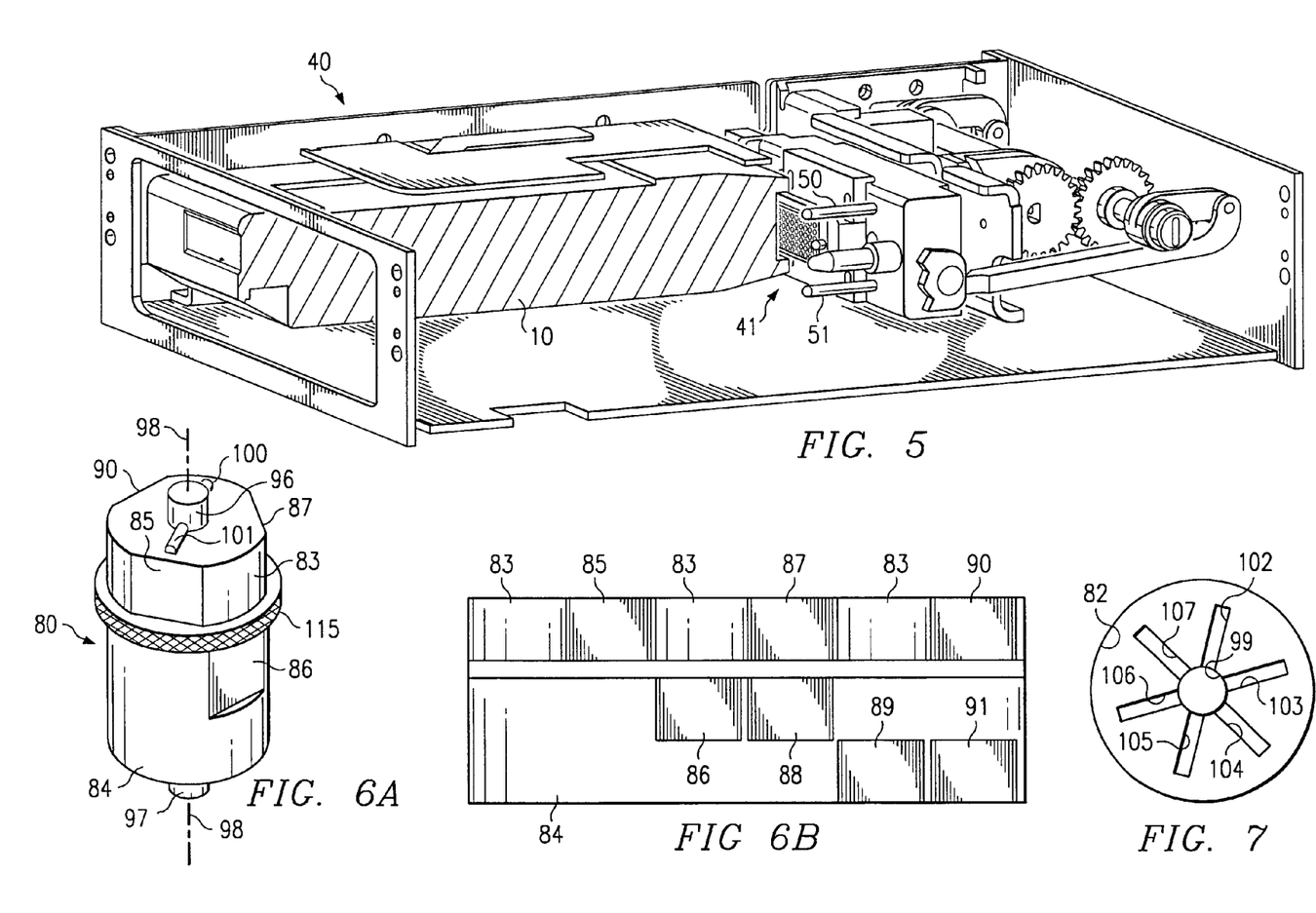
FIG. 5 is an isometric view of a cartridge loading mechanism for sensing the encoded multi-position mechanical indicator of FIGS. 3A–3D in the portable data storage cartridge of FIGS. 1 and 2.
FIGS. 6A and 6B are, respectively, an isometric view of an alternative embodiment of an encoded multi-position mechanical indicator, and an illustration of the peripheral surface of the mechanical indicator.
FIG. 7 is a bottom view of the top of a chamber in a portable data storage cartridge for supporting the encoded multi-position mechanical indicator of FIGS. 6A and 6B.

Referring additionally to FIG. 5, a transfer station or data storage drive 40 is illustrated which accesses the portable data storage cartridge 10 of FIG. 1. The example of FIG. 5 comprises a transfer station such as discussed in the incorporated U.S. patent application Ser. No. 09/842,030. The cartridge 10 is illustrated in the loaded position in the transfer station in which electrical contacts of an external interface 17 within the cartridge 10 of FIG. 2 are engaged by a matching connector 41 of the transfer station 40.

Switches 50 and 51 of the transfer station or data storage drive comprise pressure sensitive switches, and are of a length such that, when the cartridge 10 is fully loaded, they contact and sense a cylindrical surface of the multi-position mechanical indicator rotary device 20 of FIGS. 3A–3D and 4A–4I, and fail to contact or sense a facet.

Referring to FIGS. 3A–3D and 4A–4I, herein, a "facet" is defined as a flat, concave or slightly convex surface such that the radius of a facet 33, 34 from the central axis of rotation 28 is substantially less than that of a cylindrical surface 30.

In one embodiment of the present invention, the facets of the encoded pattern are parallel to the central axis of rotation of the rotary device, such that they and the cylindrical surfaces interact with switches to provide the desired indications.

The facets and cylindrical surfaces operate pressure sensitive switches 50, 51 of a transfer station or data storage drive 20 of FIG. 5 to convey information to the transfer station or drive. The encoded pattern may be represented in binary terms, with the cylindrical surface comprising a "1" and activating a switch, and a facet comprising a "0" and not activating a switch. Thus, the encoded pattern of FIGS. 4C, 4F and 4I, reading from top to bottom of the rotary device, respectively, represents "0-1", "1-0" and "1-1". A fourth code would comprise a "0-0" with both an upper facet similar to facet 34, and a lower facet similar to facet 33 positioned at the exterior wall opening.

In accordance with an aspect of the present invention, no all "0" or all facet code is utilized, since no switch would be activated, which would be the same as though no cartridge were present. Thus, by having the code such that a switch is always activated when a cartridge is present, the multi-position mechanical indicator rotary device 20 also serves as a presence indicator, indicating that the cartridge 10 is fully loaded.

In one embodiment of the present invention, at least one retaining element is provided on the rotary device 20 for interacting with at least one matching retaining element of the cartridge 10 to retain the rotary device in at least one of the rotary positions. In the example of FIGS. 2, 3A–3D and 4A–4I, the rotary device retaining element comprises a detent 60, and the matching retaining element of the cartridge comprises a plurality of indentations 61–63 in the cartridge chamber 22, such that the rotary device retaining element detent 60 may rest in any of the plurality of indentations. Also, in the example of FIGS. 3A–3D and 4A–4I, the rotary device 20 may comprise a single molded piece, such that the device, and therefore, the rotary device retaining element detent 60, comprises a resilient material. The rotary device is arranged to fit within the chamber 22 of the cartridge with a compression force thereon when the rotary device retaining element detent is out of all of the plurality of indentations in the cartridge chamber, also urging the detent into the indentations. Alternatively, only the detent 60 of the rotary device 20 may comprise a resilient material. A member 70 of the rotary device 20 is arranged to rest at the bottom of the cylinder 22 of the cartridge 10 when the detent 60 is located in one of the indentations 61–63 and to maintain a compression force on the rotary device such that the detent is unlikely to move out of the indentation.

The resilient material preferably comprises a resilient plastic having a long fatigue life, such as a "liquid crystal" plastic. Examples of a resilient plastic are "Valox" and "Delrin", both manufactured by General Electric.

In the example of FIGS. 3A–3D and 4A–4I, the rotary device 20 comprises a slot 72 into which a tool, such as a screwdriver, may be inserted to rotate the rotary device from one rotary position to another. Alternatively, element 73 of FIG. 3D may extend outside the cartridge shell for manual engagement to rotate the rotary device 20.

FIGS. 6A and 6B illustrate an alternative embodiment of a rotary device 80 in accordance with the present invention, and FIG. 7 illustrates a corresponding chamber 82 of the cartridge 10 into which the rotary device 80 is fitted. FIG. 6B illustrates the layout of the encoded pattern of cylindrical surfaces 83 and 84 of FIG. 6B and of a plurality of facets 85–91 interrupting the cylindrical surfaces. The encoded pattern comprises six positions in three rows, reading from top to bottom of the rotary device, and moving from left to right, respectively, represent "1-1-1", "0-1-1", "1-0-1", "0-0-1", "1-1-0" and "0-1-0", with the cylindrical surfaces representing "1" because they actuate the sensing switch. Again, no all facet or all "0" position is provided such that the rotary device 80 may also comprise a presence detector. Each of the six positions may therefore represent different information regarding the portable data storage cartridge in which the rotary device 80 is positioned.

To read the three rows of the pattern, the number of switches 50, 51 of the transfer station or data storage drive 40 of FIG. 5 is increased to three switches.

The number of rows of facets, and the corresponding number of switches 50, 51, may be increased as needed to provide additional information.

The multi-position mechanical indicator rotary device 80 is in the general form of at least one right cylindrical section with pivots 96 and 97 having a central axis of rotation 98 such that the pivots engage bearings, such as bearing 99, in the chamber 82 of the portable data storage cartridge 10 of FIG. 2, so as to allow rotation of the rotary device.

Figure 8:
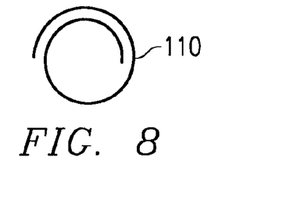
FIG. 8 is a top view of a spring for urging the encoded multi-position mechanical indicator of FIGS. 6A and 6B toward the top of the chamber of FIG. 7.

In the example of FIGS. 6A and 7, the rotary device retaining element comprises detents 100, 101, and the matching retaining element of the cartridge comprises a plurality of indentations 102–107 in the cartridge chamber 82, such that the rotary device retaining element detents 100, 101 may rest in any opposed set of the plurality of indentations. A torsion spring 110 is illustrated in FIG. 8 and fits around pivot 96 of the rotary device 80 and is compressed between the rotary device 80 and the bottom of the chamber 82 to urge the detents 100, 101 into the indentations 102–107 in the cartridge chamber 82.

The detents 100, 101 are preferably rounded to allow repositioning of the rotary device if needed. In one embodiment of the invention, as illustrated in FIG. 6A, a cylindrical section 115 of larger diameter than the cylindrical surfaces 83, 84 is provided, comprising a thumb wheel for rotating the rotary device in the chamber of the cartridge. The thumb wheel cylindrical section 115 preferably comprises a roughened surface for engaging the thumb wheel. The cartridge is provided with a slot for accommodating the thumb wheel, such that the thumb wheel extends into the opening and is accessible for manual rotation and repositioning of the rotary device.

Figure 9A:
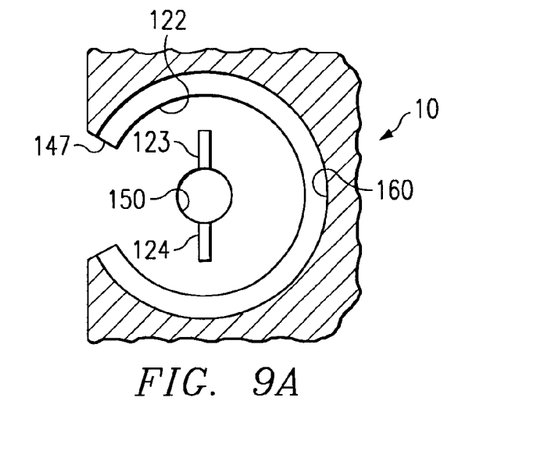
FIGS. 9A and 9B are, respectively, a bottom view of the top of an alternative embodiment of a chamber, and a side cut away view of the chamber in a portable data storage cartridge.
Figure 9B:
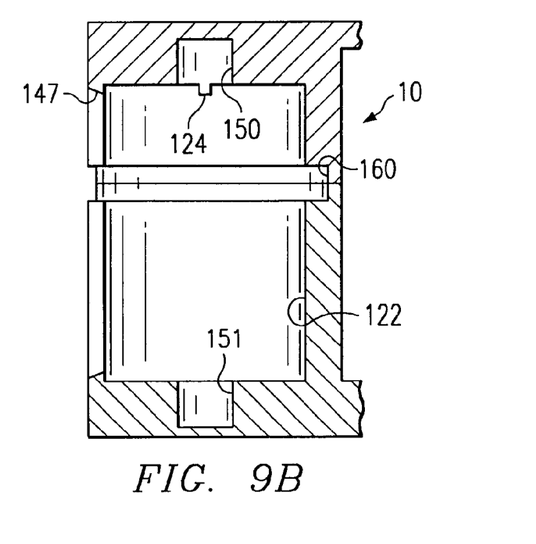

Referring to FIGS. 9A and 9B, an alternative embodiment of a chamber 122 of the portable data storage cartridge 10 is illustrated, providing a set of opposed detents 123 and 124 as the matching retaining element of the cartridge. In FIG.

Figure 10:
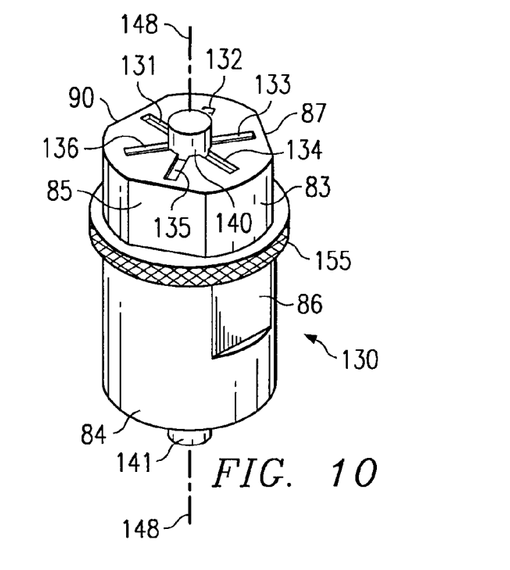
FIG. 10 is an iso metric view of an alternative embodiment of an encoded multi-position mechanical indicator to be positioned in the chamber of FIGS. 9A and 9B.

10, the retaining element for the rotary device 130 comprises a plurality of indentations 131–136, such that the cartridge matching retaining element detents 123, 124 may rest in any of the plurality of indentations. An advantage of providing a single detent or single set of detents in the cartridge is that upgrades may be made requiring additional indicator positions, and only the rotary device 130 is altered. The relatively expensive molds for the cartridge shell are unchanged. In the example of FIGS. 9A, 9B and 10, the rotary device 130 may comprise a resilient material, and the rotary device is arranged to fit within the chamber 122 of the cartridge with a compression force thereon when the detents 123, 124 are out of all of the plurality of indentations of the rotary device, urging the detents into the indentations. As discussed above, the resilient material preferably comprises a resilient plastic having a long fatigue life, such as a "liquid crystal" plastic, examples comprising "Valox" and "Delrin", both manufactured by General Electric. Alternatively, also as discussed above, a spring may be utilized to urge the detents into the indentations.

In the example of FIG. 10, the multi-position mechanical indicator rotary device 130 comprises the identical encoded pattern as the rotary device 80 of FIGS. 6A and 6B. At differing rotational positions of the rotary device, at least one or none of the facets 85–91 of FIG. 6B is positioned at an exterior wall opening 147 of the portable data storage cartridge 10 of FIGS. 9A and 9B.

The rotary device 130 is in the general form of at least one right cylindrical section with pivots 140 and 141 having a central axis of rotation 148 such that the pivots engage bearings 150 and 151 in the chamber 122 of the portable data storage cartridge 10 of FIGS. 9A and 9B, so as to allow rotation of the rotary device.

The detents 123, 124 are preferably rounded to allow repositioning of the rotary device if needed. In the example of FIG. 10, a cylindrical section 155 of larger diameter than the cylindrical surfaces 83, 84 is provided, comprising a thumb wheel for rotating the rotary device in the chamber of the cartridge. A slot 160 is provided in the chamber 122 of the cartridge 10 of FIGS. 9A and 9B to accommodate the thumb wheel 155, such that the thumb wheel extends into the opening 147 and is accessible for manual rotation and repositioning of the rotary device 130.

Figure 11:
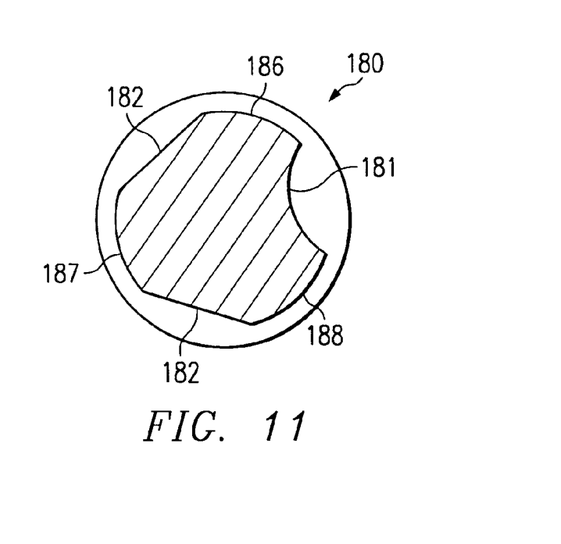
FIG. 11 is a cross-section view of another alternative embodiment of a multi-position mechanical indicator to be positioned in the chamber of FIGS. 9A and 9B.

A further alternative embodiment of a rotary device 180 is illustrated in FIG. 11, having a concave facet 181. A concave facet allows three code levels to be employed. For example, a concave facet 181 may represent "0", flat facets 182 and 183 may each represent "A", and cylindrical surfaces 186, 187 and 188 may each represent "1". Thus, when the associated cartridge is inserted in a transfer station or data storage drive, such as transfer station 40 of FIG. 5, the switches 50, 51 may each comprise three-position switches in order to fully read the encoded facets. Alternatively, both the flat facets 182, 183 and the concave facet 181 may represent "0" with one set of sensing switches 50, 51, and both the flat facets 182, 183 and the cylindrical surfaces 186, 187, 188 may represent "1" with an alternative set of sensing switches 50, 51.

As is known to those of skill in the art, alternative codes may be employed, alternative materials may be employed, and alternative arrangements of the retaining elements may be employed.

While the preferred embodiments of the present invention have been illustrated in detail, it should be apparent that modifications and adaptations to those embodiments may occur to one skilled in the art without departing from the scope of the present invention as set forth in the following claims.

We claim:

1. A multi-position mechanical indicator for a portable data storage cartridge having at least a data storage medium therein; said portable data storage cartridge having a chamber therein, said chamber closely adjacent an exterior wall of said portable data storage cartridge; and said portable data storage cartridge having an opening extending through said exterior wall to said chamber; said indicator comprising:

a rotary device in the general form of at least one right cylindrical section having a central axis of rotation, and arranged to be rotatable in said chamber; and a peripheral surface of said rotary device right cylindrical section having an encoded pattern of at least one cylindrical surface and of a plurality of facets interrupting said at least one cylindrical surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge.

2. The multi-position mechanical indicator of claim 1, additionally comprising at least one rotary device retaining element for interacting with at least one matching retaining element of said cartridge to retain said rotary device in at least one of said rotary positions.

3. The multi-position mechanical indicator of claim 1, wherein said rotary device right cylindrical section additionally comprises a cylindrical section of larger diameter than said at least one cylindrical surface, comprising a thumb wheel for rotating said rotary device in said chamber of said cartridge.

4. The multi-position mechanical indicator of claim 3, wherein said thumb wheel cylindrical section comprises a roughened surface for engaging said thumb wheel cylindrical section.

5. The multi-position mechanical indicator of claim 1, wherein each said facet of said encoded pattern is parallel to said central axis of rotation of said rotary device.

6. The multi-position mechanical indicator of claim 2, wherein said rotary device retaining element comprises at least one detent, and wherein said matching retaining element of said cartridge comprises a plurality of indentations in said cartridge chamber, said plurality of indentations in a plane perpendicular to said rotary device central axis and angularly shifted with respect to said rotary device central axis, whereby said at least one rotary device retaining element detent may rest in any of said plurality of indentations.

7. The multi-position mechanical indicator of claim 6, wherein said at least one rotary device retaining element detent comprises a resilient material; and wherein said rotary device is arranged to fit within said chamber of said cartridge with a compression force thereon in said axial direction of said rotary device central axis upon said at least one rotary device retaining element detent being out of all of said plurality of indentations in said cartridge chamber.

8. The multi-position mechanical indicator of claim 2, wherein said rotary device retaining element comprises a plurality of indentations, said plurality of indentations in a plane perpendicular to said rotary device central axis and angularly shifted with respect to said rotary device central axis; and wherein said matching retaining element of said cartridge comprises at least one detent which may rest in any of said plurality of indentations.

9. The multi-position mechanical indicator of claim 8, wherein said rotary device comprises a resilient material;

and wherein said rotary device is arranged to fit within said chamber of said cartridge with a compression force thereon in said axial direction of said rotary device central axis upon said at least one matching retaining element detent being out of all of said plurality of indentations of said rotary device retaining element.

10. A multi-position mechanical indicator for a portable data storage cartridge having at least a data storage medium therein; said portable data storage cartridge having a chamber therein, said chamber closely adjacent an exterior wall of said portable data storage cartridge; and said portable data storage cartridge having an opening extending through said exterior wall to said chamber; said indicator comprising:

a rotary device in the general form of at least one right cylindrical section having a central axis of rotation, and arranged to be rotatable in said chamber;

a peripheral surface of said rotary device right cylindrical section having an encoded pattern of at least one cylindrical surface and of a plurality of facets, each said facet parallel to said central axis of rotation of said rotary device, said facets interrupting said at least one cylindrical surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge; and at least one rotary device retaining element for interacting with at least one matching retaining element of said cartridge to retain said rotary device in at least one of said rotary positions, wherein said rotary device retaining element comprises at least one detent, and wherein said matching retaining element of said cartridge comprises a plurality of indentations in said cartridge chamber, said plurality of indentations in a plane perpendicular to said rotary device central axis and angularly shifted with respect to said rotary device central axis, whereby said at least one rotary device retaining element detent may rest in any of said plurality of indentations.

11. The multi-position mechanical indicator of claim 10, wherein said at least one rotary device retaining element detent comprises a resilient material; and wherein said rotary device is arranged to fit within said chamber of said cartridge with a compression force thereon in said axial direction of said rotary device central axis upon said at least one rotary device retaining element detent being out of all of said plurality of indentations in said cartridge chamber.

12. The multi-position mechanical indicator of claim 10, additionally comprising a spring located at an end of said rotary device opposite said at least one rotary device retaining element detent and located within said cartridge chamber urging said rotary device toward said cartridge matching retaining element indentations.

13. The multi-position mechanical indicator of claim 10, wherein said rotary device right cylindrical section additionally comprises a cylindrical section of larger diameter than said at least one cylindrical surface, comprising a thumb wheel for rotating said rotary device in said chamber of said cartridge.

14. A multi-position mechanical indicator for a portable data storage cartridge having at least a data storage medium therein; said portable data storage cartridge having a chamber therein, said chamber closely adjacent an exterior wall of said portable data storage cartridge; and said portable data storage cartridge having an opening extending through said exterior wall to said chamber; said indicator comprising:

a rotary device in the general form of at least one right cylindrical section having a central axis of rotation, and arranged to be rotatable in said chamber;

a peripheral surface of said rotary device right cylindrical section having an encoded pattern of at least one cylindrical surface and of a plurality of facets, each said facet parallel to said central axis of rotation of said rotary device, said facets interrupting said at least one cylindrical surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge; and at least one rotary device retaining element for interacting with at least one matching retaining element of said cartridge to retain said rotary device in at least one of said rotary positions, wherein said rotary device retaining element comprises a plurality of indentations, said plurality of indentations in a plane perpendicular to said rotary device central axis and angularly shifted with respect to said rotary device central axis; and wherein said matching retaining element of said cartridge comprises at least one detent which may rest in any of said plurality of indentations.

15. The multi-position mechanical indicator of claim 14, wherein said rotary device comprises a resilient material; and wherein said rotary device is arranged to fit within said chamber of said cartridge with a compression force thereon in said axial direction of said rotary device central axis upon said at least one cartridge matching retaining element detent being out of all of said plurality of indentations of said rotary device retaining element.

16. The multi-position mechanical indicator of claim 14, additionally comprising a spring located at an end of said rotary device opposite said rotary device retaining element plurality of indentations and located within said cartridge chamber urging said rotary device toward said at least one cartridge matching retaining element detent.

17. The multi-position mechanical indicator of claim 14, wherein said rotary device right cylindrical section additionally comprises a cylindrical section of larger diameter than said at least one cylindrical surface, comprising a thumb wheel for rotating said rotary device in said chamber of said cartridge.

18. A multi-position mechanical indicator for a portable data storage cartridge having at least a data storage medium therein; said portable data storage cartridge having a chamber therein, said chamber closely adjacent an exterior wall of said portable data storage cartridge; and said portable data storage cartridge having an opening extending through said exterior wall to said chamber; said indicator comprising:

a rotary device in the general form of at least one right cylindrical section having a central axis of rotation, and arranged to be rotatable in said chamber; and a peripheral surface of said rotary device right cylindrical section having an encoded pattern of at least one cylindrical surface and of a plurality of facets interrupting said at least one cylindrical surface, said facets located at a radius from said central axis of rotation substantially less than that of said at least one cylindrical surface, said facets located at various axial positions in the direction of said central axis of rotation, and said plurality of facets located at various angularly spaced rotational positions about said central axis of rotation, forming an encoded pattern; whereby, at differing rotational positions of said rotary device, at least one or none of said facets is positioned at said exterior wall opening of said portable data storage cartridge, said encoded pattern such that said cylindrical surface always is present at a position of said exterior wall opening, serving as a presence indicator.

19. A portable data storage cartridge, comprising:

at least a data storage medium;

an enclosure for said data storage medium, said enclosure having at least one exterior wall therein;

a chamber within said enclosure, said chamber closely adjacent said at least one exterior wall;

an opening extending through said exterior wall to said chamber;

a rotary device in the general form of at least one right cylindrical section having a central axis of rotation, and arranged to be rotatable in said chamber; and a peripheral surface of said rotary device right cylindrical section having an encoded pattern of at least one cylindrical surface and of a plurality of facets interrupting said at least one cylindrical surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge.

20. The portable data storage cartridge of claim 19, additionally comprising at least one rotary device retaining element for interacting with at least one matching retaining element of said cartridge to retain said rotary device in at least one of said rotary positions.

21. The portable data storage cartridge of claim 19, wherein said rotary device right cylindrical section additionally comprises a cylindrical section of larger diameter than said at least one cylindrical surface, comprising a thumb wheel for rotating said rotary device in said chamber of said cartridge.

22. The portable data storage cartridge of claim 21, wherein said thumb wheel cylindrical section comprises a roughened surface for engaging said thumb wheel cylindrical section.

23. The portable data storage cartridge of claim 19, wherein each said facet of said encoded pattern is parallel to said central axis of rotation of said rotary device.

24. The portable data storage cartridge of claim 20, wherein said rotary device retaining element comprises at least one detent, and wherein said matching retaining element of said cartridge comprises a plurality of indentations in said cartridge chamber, said plurality of indentations in a plane perpendicular to said rotary device central axis and angularly shifted with respect to said rotary device central axis, whereby said at least one rotary device retaining element detent may rest in any of said plurality of indentations.

25. The portable data storage cartridge of claim 24, wherein said at least one rotary device retaining element detent comprises a resilient material; and wherein said rotary device is arranged to fit within said chamber of said cartridge with a compression force thereon in said axial direction of said rotary device central axis upon said at least one rotary device retaining element detent being out of all of said plurality of indentations in said cartridge chamber.

26. The portable data storage cartridge of claim 20, wherein said rotary device retaining element comprises a plurality of indentations, said plurality of indentations in a plane perpendicular to said rotary device central axis and angularly shifted with respect to said rotary device central axis; and wherein said matching retaining element of said cartridge comprises at least one detent which may rest in any of said plurality of indentations.

27. The portable data storage cartridge of claim 26, wherein said rotary device comprises a resilient material; and wherein said rotary device is arranged to fit within said chamber of said cartridge with a compression force thereon in said axial direction of said rotary device central axis upon said at least one matching retaining element detent being out of all of said plurality of indentations of said rotary device retaining element.

28. A portable data storage cartridge, comprising:

at least a data storage medium;

an enclosure for said data storage medium, said enclosure having at least one exterior wall therein;

a chamber within said enclosure, said chamber closely adjacent said at least one exterior wall;

an opening extending through said exterior wall to said chamber;

a rotary device in the general form of at least one right cylindrical section having a central axis of rotation, and arranged to be rotatable in said chamber;

a peripheral surface of said rotary device right cylindrical section having an encoded pattern of at least one cylindrical surface and of a plurality of facets, each said facet parallel to said central axis of rotation of said rotary device, said facets interrupting said at least one cylindrical surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge; and at least one rotary device retaining element for interacting with at least one matching retaining element of said cartridge to retain said rotary device in at least one of said rotary positions, wherein said rotary device retaining element comprises at least one detent, and wherein said matching retaining element of said cartridge comprises a plurality of indentations in said cartridge chamber, said plurality of indentations in a plane perpendicular to said rotary device central axis and angularly shifted with respect to said rotary device central axis, whereby said at least one rotary device retaining element detent may rest in any of said plurality of indentations.

29. The portable data storage cartridge of claim 28, wherein said at least one rotary device retaining element detent comprises a resilient material; and wherein said rotary device is arranged to fit within said chamber of said cartridge with a compression force thereon in said axial direction of said rotary device central axis upon said at least one rotary device retaining element detent being out of all of said plurality of indentations in said cartridge chamber.

30. The portable data storage cartridge of claim 28, additionally comprising a spring located at an end of said rotary device opposite said at least one rotary device retaining element detent and located within said cartridge chamber urging said rotary device toward said cartridge matching retaining element indentations.

31. The portable data storage cartridge of claim 28, wherein said rotary device right cylindrical section additionally comprises a cylindrical section of larger diameter than said at least one cylindrical surface, comprising a thumb wheel for rotating said rotary device in said chamber of said cartridge.

32. A portable data storage cartridge, comprising:

at least a data storage medium;

an enclosure for said data storage medium, said enclosure having at least one exterior wall therein;

a chamber within said enclosure, said chamber closely adjacent said at least one exterior wall;

an opening extending through said exterior wall to said chamber;

a rotary device in the general form of at least one right cylindrical section having a central axis of rotation, and arranged to be rotatable in said chamber;

a peripheral surface of said rotary device right cylindrical section having an encoded pattern of at least one cylindrical surface and of a plurality of facets, each said facet parallel to said central axis of rotation of said rotary device, said facets interrupting said at least one cylindrical surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge; and at least one rotary device retaining element for interacting with at least one matching retaining element of said cartridge to retain said rotary device in at least one of said rotary positions, wherein said rotary device retaining element comprises a plurality of indentations, said plurality of indentations in a plane perpendicular to said rotary device central axis and angularly shifted with respect to said rotary device central axis; and wherein said matching retaining element of said cartridge comprises at least one detent which may rest in any of said plurality of indentations.

33. The portable data storage cartridge of claim 32, wherein said rotary device comprises a resilient material; and wherein said rotary device is arranged to fit within said chamber of said cartridge with a compression force thereon in said axial direction of said rotary device central axis upon said at least one cartridge matching retaining element detent being out of all of said plurality of indentations of said rotary device retaining element.

34. The portable data storage cartridge of claim 32, additionally comprising a spring located at an end of said rotary device opposite said rotary device retaining element plurality of indentations and located within said cartridge chamber urging said rotary device toward said at least one cartridge matching retaining element detent.

35. The portable data storage cartridge of claim 32, wherein said rotary device right cylindrical section additionally comprises a cylindrical section of larger diameter than said at least one cylindrical surface, comprising a thumb wheel for rotating said rotary device in said chamber of said cartridge.

36. A portable data storage cartridge, comprising:

at least a data storage medium;

an enclosure for said data storage medium, said enclosure having at least one exterior wall therein;

a chamber within said enclosure, said chamber closely adjacent said at least one exterior wall;

an opening extending through said exterior wall to said chamber;

a rotary device in the general form of at least one right cylindrical section having a central axis of rotation, and arranged to be rotatable in said chamber; and a peripheral surface of said rotary device right cylindrical section having an encoded pattern of at least one cylindrical surface and of a plurality of facets interrupting said at least one cylindrical surface, said facets located at a radius from said central axis of rotation substantially less than that of said at least one cylindrical surface, said facets located at various axial positions in the direction of said central axis of rotation, and said plurality of facets located at various angularly spaced rotational positions about said central axis of rotation, forming an encoded pattern; whereby, at differing rotational positions of said rotary device, at least one or none of said facets is positioned at said exterior wall opening of said portable data storage cartridge, said encoded pattern such that said cylindrical surface always is present at a position of said exterior wall opening, serving as a presence indicator.

37. A multi-position mechanical indicator for a portable data storage cartridge having at least a data storage medium therein; said portable data storage cartridge having a chamber therein, said chamber closely adjacent an exterior wall of said portable data storage cartridge; and said portable data storage cartridge having an opening extending through said exterior wall to said chamber; said indicator comprising:

a rotary device in the general form of at least one right cylindrical section having a central axis of rotation, and arranged to be rotatable in said chamber; and a peripheral surface of said rotary device right cylindrical section having an encoded pattern of at least one cylindrical surface and of a plurality of facets interrupting said at least one cylindrical surface, at least one of said facets comprising a concave surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge.

38. A portable data storage cartridge, comprising:

at least a data storage medium;

an enclosure for said data storage medium, said enclosure having at least one exterior wall therein;

a chamber within said enclosure, said chamber closely adjacent said at least one exterior wall;

an opening extending through said exterior wall to said chamber;

a rotary device in the general form of at least one right cylindrical section having a central axis of rotation, and arranged to be rotatable in said chamber; and a peripheral surface of said rotary device right cylindrical section having an encoded pattern of at least one cylindrical surface and of a plurality of facets interrupting said at least one cylindrical surface, at least one of said facets comprising a concave surface, said facets located at various axial positions in the direction of said central axis of rotation, and said plurality of facets located at various angularly spaced rotational positions about said central axis of rotation; whereby, at differing rotational positions of said rotary device, at least one or none of said facets is positioned at said exterior wall opening of said portable data storage cartridge.

* * * * *

UNITED STATES PATENT AND TRADEMARK OFFICE
CERTIFICATE OF CORRECTION

PATENT NO.     : 6,744,595 B2
DATED          : June 1, 2004
INVENTOR(S)    : Blair et al.

It is certified that error appears in the above-identified patent and that said Letters Patent is hereby corrected as shown below:

Column 13,
Line 34, include new paragraph to read as follows:
-- data storage cartridge; and at least one rotary device --

Signed and Sealed this

Twelfth Day of October, 2004

JON W. DUDAS
*Director of the United States Patent and Trademark Office*